(12) United States Patent  
Griffin et al.

(10) Patent No.: US 9,448,340 B2  
(45) Date of Patent: Sep. 20, 2016

(54) EMBEDDED DIFFUSER STRUCTURE

(71) Applicant: The Technology Partnership Plc, Royston, Hertfordshire (GB)

(72) Inventors: Neil Griffin, Royston (GB); Roger Clarke, Royston (GB)

(73) Assignee: The Technology Partnership Plc (GB)

( * ) Notice: Subject to any disclaimer, the term of this patent is extended or adjusted under 35 U.S.C. 154(b) by 0 days.

(21) Appl. No.: 14/773,134

(22) PCT Filed: Mar. 7, 2014

(86) PCT No.: PCT/GB2014/050680  
§ 371 (c)(1),  
(2) Date: Sep. 4, 2015

(87) PCT Pub. No.: WO2014/135892  
PCT Pub. Date: Sep. 12, 2014

(65) Prior Publication Data  
US 2016/0011342 A1    Jan. 14, 2016

(30) Foreign Application Priority Data  
Mar. 7, 2013   (GB) .................................... 1304114

(51) Int. Cl.  
*G02B 5/02* (2006.01)  
*G03B 21/62* (2014.01)  
*G02B 27/01* (2006.01)

(52) U.S. Cl.  
CPC ........... *G02B 5/0236* (2013.01); *G02B 5/0289* (2013.01); *G02B 5/0294* (2013.01); *G03B 21/62* (2013.01); *G02B 2027/0194* (2013.01)

(58) Field of Classification Search  
CPC .... G02B 6/0023; G02B 6/0026; G02B 5/02; G02B 5/0236; G02B 5/0289; G03B 21/56  
USPC ........................................................ 359/443  
See application file for complete search history.

(56) References Cited

U.S. PATENT DOCUMENTS

| | | | |
|---|---|---|---|
| 2003/0133191 A1 | 7/2003 | Morita et al. | |
| 2003/0174490 A1* | 9/2003 | Allinson ............. | G02B 6/0036 362/619 |
| 2006/0291238 A1* | 12/2006 | Epstein ................ | G02B 6/0055 362/600 |
| 2009/0067057 A1 | 3/2009 | Sprague et al. | |

FOREIGN PATENT DOCUMENTS

WO        2011124897 A1    10/2011

OTHER PUBLICATIONS

International Search Report for Application No. PCT/GB2014/050680 dated Aug. 4, 2014.

* cited by examiner

*Primary Examiner* — Chris Mahoney  
(74) *Attorney, Agent, or Firm* — Lerner, David, Littenberg, Krumholz & Mentlik, LLP

(57) ABSTRACT

An optical device comprises an optical diffuser structure embedded between media of substantially the same optical refractive index. The structure comprises a partially reflective optical coating at the interface between the two media. The partially reflective optical coating comprises a relief profile such that, in use, the optical diffuser structure diffuses light in reflection from the partially reflective optical coating and delivers substantially no optical deflection in transmission.

19 Claims, 8 Drawing Sheets

EMBEDDED DIFFUSER STRUCTURE

CROSS-REFERENCE TO RELATED APPLICATIONS

This application is a national phase entry under 35 U.S.C. §371 of International Application No. PCT/GB2014/050680, filed Mar. 7, 2014, which claims priority to Great Britain Patent Application No. 1304114.0, filed on Mar. 7, 2013, the disclosures of which are incorporated herein by reference.

The present invention relates to structures embedded within an optical device.

Embedded structures have been known for many years as being capable of redirecting light within optical devices. For example, a flat plane with appropriate coatings inside a polarising beam splitter cube redirects light according to its polarisation.

Another example of an embedded structure is disclosed by WO2011124897A, wherein a grating element that is embedded within the lens redirects light from the side of the lens (i.e. the frame leg region) into the eye of an observer at an angle perpendicular to the pupil. Other known optical structures, for example, diffusing structures, are located on the surfaces of optical components. Diffusing structures scatter light into a range of angles, the properties of which depend on the design of the diffusing surfaces. These are useful for applications such as display screens, where light from a projector which is incident on a diffusing screen is reflected or transmitted and typically diffused over a large angular distribution so that the image on the screen can be observed from a wide range of viewing angles. Some 'high gain' diffusing screens have a narrower range of diffusing angles.

Most stand-alone projector diffusing screens are typically white or opaque, so most of the light that is incident on the diffusing screen is reflected and diffused back towards the viewer. However, if the diffusing screen were made of transparent material, then the view through the diffusing screen would also be diffused. Hence, no coherent image can be seen through the transparent screen. It is noted that the principles of operation of a common projector diffusing screen may be observed in back projection TVs, which use transmission diffusers, in which no image can be seen through the diffusing screen.

So, current optical devices cannot achieve transparency (such that they can be used like a window) and simultaneously act as a display screen (for information display, for example), since the diffusing surface is required to scatter the projected image back to the viewer, but it always results in a through-image which is also diffused. However, many applications require an optical device which serves both purposes. There is therefore a need for such an optical device that can achieve both of transparency and display requirements simultaneously.

According to the present invention, there is provided an optical device comprising an optical diffuser structure embedded between media of substantially the same optical refractive index, the structure comprising a partially reflective optical coating at the interface between the two media, wherein the partially reflective optical coating comprises a relief profile such that, in use, the optical diffuser structure diffuses light in reflection from the partially reflective optical coating and delivers substantially no optical deflection in transmission.

In the present invention, the term "relief" should be understood to mean that the profile of the partially reflective optical coating comprises some roughness, is partially raised, or that it has a depth. In this arrangement, light that approaches the interface between the two media of substantially the same refractive index is either reflected or transmitted. No optical deflection is delivered to transmitted light due to the two media of matched refractive index in which the optical diffuser structure is embedded. However, the light that is reflected is diffused due to the relief profile of the partially reflective optical coating. Therefore, the present invention is able to achieve dual objectives of acting as a diffusing reflective surface as well as allowing unmodified light to be transmitted (for a clear window) through the arrangement of its features.

The properties of the diffuser structure of the present invention can allow the reflected light to be diffused into a selected range of angles, thus increasing the luminance of the observed image when a smaller range of diffusing angles is used. This is particularly useful when the observer is in a known location, when energy efficiency is required, or when privacy is required so that other observers cannot see the image outside of the range of diffusing angles.

The partially reflective optical coating at the interface of the two media determines the optical properties of the optical device, for example, the degree of reflectivity, polarisation or spectral content of the optical device. The media of the optical device may comprise glass, plastics material and/or any other substantially transparent material.

In some examples of the present invention, the relief profile has a depth of between 0.1 micron and 500 microns.

In other examples of the present invention, the relief profile has a depth of over 500 microns.

In one embodiment of the present invention, the optical diffuser structure of the optical device follows a surface of a flat plane.

In other embodiments of the present invention, the embedded diffuser structure can be used in conjunction with other optical surfaces embedded within the optical device. For example, the diffuser structure can be incorporated to follow the curved surface of a structure embedded within the optical device, such as a parabolic mirror. In another example, the diffuser structure can be incorporated to follow a surface of a segmented curved structure, for example, a Fresnel-like reflector structure such as described in WO2011124897A. This enables the exit angle of the diffused light to be controlled across the optical device, for example, approximately collimating the diffused light from a diverging projector source.

In some examples of the present invention, the optical coating of the optical device may be wavelength dependent. For example, the optical coating of the optical device may be arranged to reflect a band of wavelengths of light. The band of light may have a bandwidth of, for example, a few nanometers or tens of nanometers.

Further, the coating may only be reflecting for the wavelengths corresponding to the wavelengths of a projector which projects and image onto the optical diffusing structure, therefore giving strong reflectance for the projected light over a small wavelength band, and simultaneously maintaining a large average transmission over the visible spectrum. This is particularly useful when laser projectors are used, since their emission spectrum is very narrow.

In some embodiments of the present invention, the optical coating of the optical device reflects visible or near-visible light.

It will be appreciated that the present invention may be arranged to modulate the reflectivity of the reflecting surface to increase or decrease the effect of the optical diffusing structure during the operation of the optical device. In some embodiments of the present invention, the optical coating of the optical device has controllable variable reflectivity. The reflectivity of the coating determines how much of the projected light is diffused, and thus the luminance of the image observed by the observer. Therefore, controlled variable reflectivity of the optical coating provides the advantage of allowing controlled variable luminance of image observed to be achieved. For example, the reflectivity of the partially reflective optical coating may be dependent upon at least one of time, temperature, position with respect to incident light, polarisation of incident light or the wavelength of incident light.

In the arrangement of the present invention where the partially reflective optical coating is polarisation dependent, the reflectivity of the partially reflective optical coating for incident unpolarised light could be reduced by a factor of two compared with incident polarised, thus increasing the efficiency of the system.

In the arrangement of the present invention where the partially reflective optical coating is temperature dependent, the controllable variable reflectivity of the optical diffuser structure may be achieved via a redox reaction which changes the reflectivity of the optical coating, or a change of reflectivity with temperature, for example $VO_2$. Alternatively or additionally, the transmission and reflectivity of the optical device may change as the material of the optical device passes through a transition temperature, which may typically be 60° or an alternative temperature that is determined by doping during manufacture. The change to optical reflectivity may, for example, result in a greater response to infrared light, for example, in night vision or military applications.

In some examples of the present invention, the optical device can be used as a one-way window, where a first observer in a low light level environment can see through the optical device to a brighter environment without the image being modified, whereas a second observer on the brighter side of the optical device would find it difficult to see the first observer in the low light environment because of the relatively high diffused reflectance from the second observer's high light environment. This could be useful in, for example, architectural applications.

In some examples of the present invention, the optical device is substantially rigid. This is useful in applications where, for example, the optical device is required to provide some structural integrity or it is to be incorporated into a window or optometric device. In other examples of the present invention, the optical device is substantially flexible. This would be advantageous in applications where the provision of a portable device is needed. For example, a flexible optical device of the present invention could be retrofittable to a plurality of windows, optometric devices or solar cells, and the like, of various shapes and surfaces.

In an embodiment of the present invention, the optical device may further comprise a partially transmitting mirror, which partially transmits incident light without deviation and partially reflects incident light in a specular manner. Advantageously, this provides an optical device whereby both diffuse reflectance and specular reflectance are achieved as well as undeviated transmitted light. The partially transmitting mirror may be substantially flat or substantially curved, or it may follow a Fresnel structure. The partially transmitting mirror may be embedded between the media of substantially the same optical refractive index and adjacent the optical diffuser structure. Alternatively, the partially transmitting mirror may be outside and adjacent the media of substantially the same optical refractive index. An example of an application of this embodiment of the present invention may be in mirrors that can also act as displays, wherein a projector may be used to provide the image to be displayed from either the same side of the optical device as an observer or from the opposite side of the optical device as an observer. The observer may either view the optical device from a direction whereby the partially transmitting mirror is at a closer distance to them, or whereby the optical diffuser structure is at a closer distance to them. Light which is diffused by the optical device and then and viewed by the observer may therefore either be directly reflected from the optical diffuser structure (for example, light is incident and reflected from the optical diffuser structure to the observer before it reaches the partially transmitting mirror), or the light may reach the observer via the partially transmitting mirror (for example, the light is transmitted without deviation though the partially transmitting mirror, reflected and diffused by the optical diffuser structure, and then transmitted without deviation though the partially transmitting mirror again before reaching the observer, or in another example, the light is transmitted without deviation through the optical diffuser structure, reflected without deviation by the partially transmitting mirror, reflected and diffused by the optical diffuser structure, and then transmitted without deviation before reaching the observer). It will be appreciated that any other conceivable path may be taken by the light to achieve the same effects, for example, if more than one partially transmitting mirror is provided. In the case where the light is transmitted without deviation through the optical diffuser structure, reflected without deviation by the partially transmitting mirror, reflected and diffused by the optical diffuser structure, and then transmitted without deviation before reaching the observer, the projector may be positioned on the opposite side of the optical device to the observer, and the provision of the partially transmitting mirror allows the projected light to be diffused in a forward direction, whereas the optical device would only be able to provide diffusion in a backwards direction if no partially reflective mirror were provided. It will be appreciated that depending on the reflectance of the partially transmitting mirror and/or the reflectance of the optical diffuser structure, difference cosmetic effects can be achieved with different combinations of amplitudes of undeviated transmitted light, and diffused and specular reflected light.

According to the present invention, there is also provided a system comprising: an optical device according to any preceding claim; and a projector arranged in use to project light onto the diffuser structure.

In some examples of the system of the present invention, the projector is arranged to project light through the front of the optical device. Light from the projector and other background light may be reflected and diffused from the optical device; otherwise it may pass through the optical device without any substantial optical deflection. Light approaching the optical device from the opposing side to the projector may also be reflected and diffused or transmitted. In other examples of the system of the present invention, the projector is arranged to inject light through the side of the optical device. In this respect, total internal reflection could occur prior to the projected light reaching the optical diffusing structure; increasing the angle of the incident light on the optical diffusing structure may provide better resolution for the image as viewed by the observer.

In some examples of the system of the present invention, the optical device is arranged for use in at least one of an autocue system, architectural applications, general display applications, augmented reality applications or head up displays, ophthalmetry, automotive lighting applications, solar cells or three dimensional displays.

One application of the present invention is in autocue technology, where a TV camera must look through a transparent screen but the presenter must see the autocue script in front of the camera.

In architectural applications, the present invention may involve windows that are transparent to the occupants inside the building but observers outside of the building see a decorative matt finish.

In general display applications, augmented reality applications and head-up display (HUD) applications, a projected image that is superimposed on a transparent window may be realised using the present invention.

Another application of the present invention is in ophthalmetry. For some applications where the present invention is employed in lenses or windows that are very close to the eye in use, for example, less than 10 cm, low resolution information is typically required to be displayed on the inside of the lens (for example, for warning signs), without disturbing the through image. Since the image displayed would originate at the optical diffuser structure surface, the user would not be able to focus on it, hence only simple information would be able to be displayed, for example, large shapes, colours, and temporally changing images, unless the device is combined with an additional optical device positioned near the surface of the eye in order to provide a close focus, for example, Innovega iOptik contact lenses. Additionally, the predominant external appearance of the lens would be a diffusing surface, since the surrounding environment is likely to be of a higher ambient light intensity than the region between the eyes and the lens. This is therefore a means for producing novel lens appearances whilst still maintaining optical clarity for the wearer.

For other applications in ophthalmetry where the present invention is employed in visors or masks that are, for example, between 10 to 30 cm from the eye in use, the observer may be able to accommodate or focus on the display area when a projector is used to project an image onto said display area. Typical applications for this embodiment of the present invention include bomb disposal and nuclear, chemical, biological or industrial applications where the user wears a protective suit with a visor that comprises a display at between 10 and 30 cm from the eye. In this embodiment of the present invention, the field of view of the observer may be very wide and the resolution of the image that he/she observes may be high, dependent on the design of the projector, thus enabling a wide range of information to be displayed over the observer's field of view. For example, this information could include maps, counters, timers, directions, bioinformatics, communications, text, graphics, videos, and the like. Another application of the present invention is in the automotive lighting industry (or similar applications such as architectural lighting), where bright light sources such as car headlights or spotlights can be hidden to look like they are part of the bodywork (or wall or ceiling of a building), or need to be hidden in a cosmetic fashion. This application could also extend to TVs embedded into walls or advertising panels, with the optical diffuser structure colour matched to the surroundings or information displays on electronic devices.

Another application of the present invention could be in solar cells whereby the cosmetic appearance of solar cells can be modified to be more aesthetically appealing via a matt and coloured or patterned appearance, whilst still allowing most of the incident light to be transmitted to the solar cell behind.

In all of the above mentioned applications of the present invention, a significant benefit of the diffuser technology is that a picoprojector can be used to project an image onto the screen, which allows control of the scatter angles and therefore improved efficiency. In particular, if the picoprojector is of a laser scanner type (Microvision) or a diffractive based device (Light Blue Optics), then the image maintains focus over a wide range of distances. This is useful for applications where the projector is required to be at a significant angle to the display. In contrast, the image projected from conventional projectors would only be in focus for small areas of the display (without modification of the optics) or where the diffuser surface is curved, for example, a parabolic mirror to direct the light in a forward direction.

According to the present invention, there is also provided a method of displaying images, the method including the steps of: providing an optical device comprising an optical diffuser structure embedded between media of substantially the same optical refractive index, the structure having an optical coating at the interface between the two media, wherein the partially reflective optical coating comprises a relief profile such that, in use, the optical diffuser structure diffuses light in reflection from the interface and delivers substantially no optical deflection in transmission; and providing a projector and projecting images onto the diffuser structure so that they can be viewed by an observer viewing the optical device.

The present invention will now be described with reference to the accompanying drawings in which.

Figure 1:
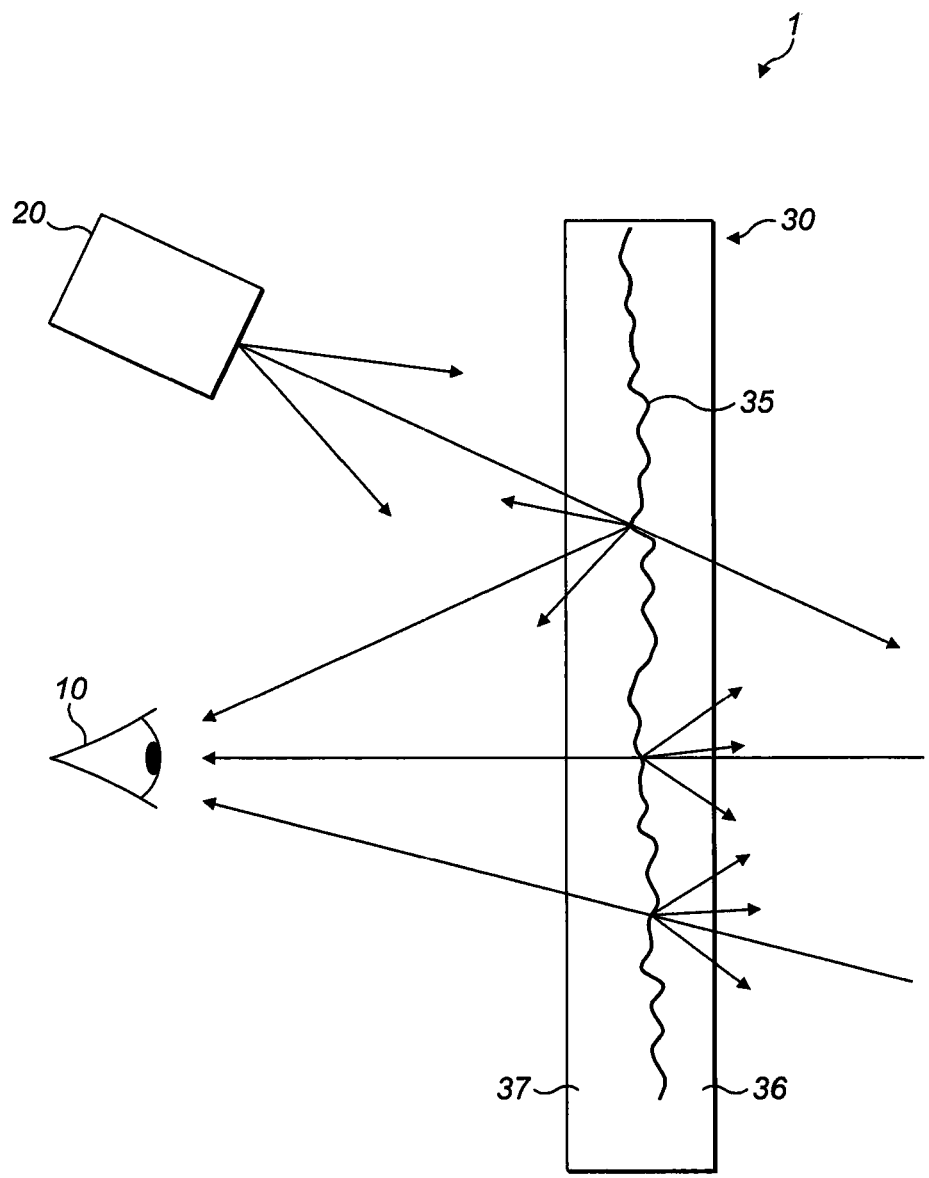
FIG. 1 shows an embodiment of the present invention.

FIG. 1 shows an example of a system 1 of the present invention comprising projector 20 and optical device 30 having optical diffuser structure 35 embedded between two media of substantially the same refractive index 36, 37. The optical diffuser structure 35 comprises a partially reflecting optical coating at the interface between the two media 36, 37, and the partially reflective optical coating comprises a relief profile such that, in use, the optical diffuser structure 35 diffuses light in reflection and delivers no optical deflection in transmission. In this example, projector 20 focusses an image onto the optical diffuser structure 35. The reflected light is diffused and the optical device 30 functions as a screen to the observer 10, such the projected image from the projector 20 is seen. The light that is transmitted from the background environment on the other side of the optical device 30 to the observer 10 is transmitted without substantial optical angular deflection as observed by the observer 10. Therefore, both the image from the projector and light from the background are viewed by the observer 10. Similarly, background light that approaches the optical device 30 from the opposing side to the projector 20 may also be reflected and diffused or transmitted without any optical deflection. It should be noted that the features of the optical device 30, including the relief profile of the optical diffuser structure 35, shown in FIG. 1 are not to scale and represent a schematic of the present invention only.

The present invention has been demonstrated to work using the following process of manufacture: a surface relief diffuser (Comar part number 160DR160) is replicated using Sylgard 184 silicone casting material to create a silicone mould of the optical diffuser structure surface. The silicone mould is used to cast a thin layer of optically clear UV curable resin (Loctite 3525) onto a flat polycarbonate substrate, such that the optical diffuser structure surface is at the resin-air interface. The optical diffuser side of the substrate is then coated with a thin layer of Ni-Chrome material, approximately between 10 and 20 nanometers, by evaporation in order to create a partially reflecting surface. The coated optical diffuser surface is then covered with a thin layer of Loctite 3525 UV curable resin, and a second flat polycarbonate substrate is placed in optical contact with the resin and then UV cured. This process creates an optical device which has two flat polycarbonate external surfaces and a partially reflecting optical diffuser structure surface sandwiched between the two layers of UV cured resin. Of course, different suitable materials can be used in any of these processes. In particular, the method of producing the partially reflective optical coating is an important process to optimise because it directly affects the reflectivity, absorption, and transmission of the partially reflective optical coating and thus the appearance of the optical device. The material properties of the resin should be chosen for the correct structural integrity of the application, for example, hardness, flexibility and resistance to delamination, in addition to other properties such as coating process compatibility, residual haze and residual colour. Given that the outer substrates of the optical device are typically significantly thicker than the resin layer, the physical device robustness, aside from delamination, is dependent upon the material properties of the outer substrates, for example its hardness, flexibility, external anti-reflective coatings, optical flatness or required optical power.

Figure 2C:
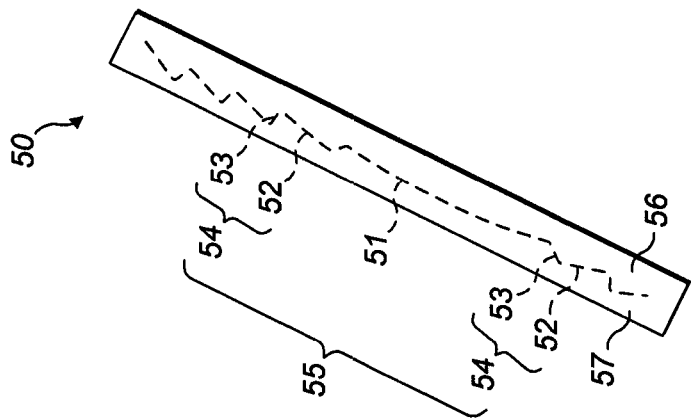
FIG. 2 shows three examples of the diffuser of the present invention.
Figure 2B:
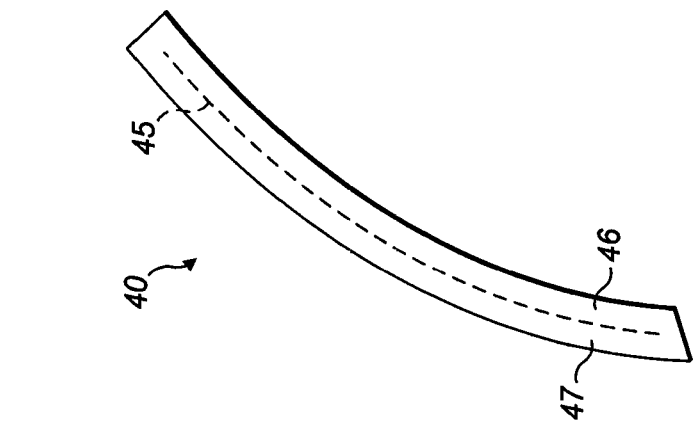
Figure 2A:
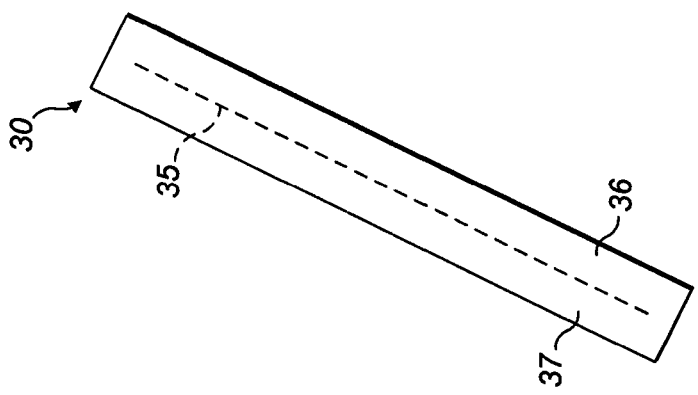

FIGS. 2a to c show three examples of optical devices that are suitable for use with systems of the present invention. FIG. 2a shows a flat optical diffuser structure 35 embedded within optical device 30 with the media 36, 37 on either side of the flat optical diffuser structure 35 having substantially the same refractive index. Light approaching the optical diffuser structure 35 at an angle below the critical angle is partially reflected and partially transmitted. However, light that approaches the optical diffuser structure 35 at an angle above the critical angle is only reflected. Reflected light is mostly reflected with an angle of reflectance equal to the angle of incidence. Thus, a wide range of viewing angles result.

FIG. 2b shows a curved optical diffuser structure 45 embedded within optical device 40 with the media 46, 47 on either side of the flat optical diffuser structure 45 having substantially the same refractive index. As shown in FIG. 2b, the media 46, 47 may be thin and curved to follow the general shape of the curved optical diffuser structure 45 may be used. However, this may often be more difficult and expensive to manufacture than the flat media 36, 37 such as those shown in FIG. 2a. Additionally, the curved optical device structure may give rise to other unwanted optical aberrations, since it essentially acts as a zero power meniscus lens. For the purpose of ease of manufacture, an alternative method of embedding the curved optical diffuser structure 45 inside an optical device (not shown in FIG. 2b) is to construct flat surfaces on either side of the curved optical diffuser structure 45. However, this creates a relatively thick optical device that may introduce unwanted image shift, optical aberrations and colour dispersion effects. It also increases the mass of the optical device.

In examples of the present invention whereby only a small range of viewing angles are desired, the optical device 45 of FIG. 2b may be used. If a slightly diffusing optical diffuser structure 45 is used, then the light is scattered from the optical diffuser structure 45 over a small range of angles, and the average angle of scatter must be directed towards the observer. Since light from the projector is typically diverging as it hits the optical diffuser structure 45, different positions on the optical diffuser structure 45 correspond to different angles of incidence. Therefore, to ensure that the image is generally observed by the observer at all positions of the optical diffuser structure 45, the average angle of diffusion must be varied with the position on the optical diffuser structure 45. For typical scenarios, the reflected angle adjustment required is similar to that of a parabolic or off-parabolic reflector. Therefore, the narrow angle optical diffuser structure 45 should follow the surface of a parabolic or similar curved reflector structure, embedded within the optical device 40. This means that the light reflected by optical diffuser structure 45 is directed towards the observer from all positions on the optical diffuser structure 45 with a narrow diffusion angle. This is a very efficient optical design and typically requires a standard, off-the-shelf projector to achieve the brightness levels required for typical applications. Indeed, the reflectivity of the optical diffuser structure 45 may be reduced to 10% or less and still maintain sufficient brightness, therefore allowing the transmission of the optical device 40 to correspondingly increase.

FIG. 2c shows a Fresnel-like optical diffuser structure 55 embedded within a thin, flat-sided optical device 50 with the media 56, 57 on either side of the flat optical diffuser structure 55 having substantially the same refractive index that mitigate the abovementioned problems of the optical diffuser structures 30 and 40 of FIGS. 2a and b. In this way, the combination of a relatively narrow angle optical diffuser structure 51 and the varying angle of the Fresnel-like diffuser structure regions 54 allows redirection of light from a projector into a narrow cone of scattered light to the observer using a thin, flat-sided optical structure of similar size to that shown in FIG. 2a. A potential problem with the Fresnel-like diffuser structure 55 is that there may be gaps in the image as seen by the observer arising due to edges 53 between the facets 52 of the optical diffuser structure 54 since the projected light is not necessarily incident normal to the plane of the Fresnel diffuser structure 55. The visual effect of this can be reduced by making the Fresnel-like optical diffuser pitch sufficiently small such that that the observer does not notice this shadowing effect at typical viewing distances. An embodiment of the present invention that utilises a Fresnel-like optical diffuser structure 55 will be shown in FIG. 8.

An alternative method by which a variable diffusion direction may be provided by an optical device of the present invention is an optical diffuser structure (not shown in the Figures) that is designed to itself change the average angle of the reflected light, and simultaneously diffuse it, as a function of position. The position dependent angle of reflectance may be achieved, for example, through the use of a holographic diffuser structure, an array of approximately designed microlenses or appropriate similar microstructures, the design of which are dependent on the specific application requirements. These provide the advantage over the optical device 50 of FIG. 2c of not requiring an additional manufacturing step of placing an optical diffuser structure, for example, over a Fresnel-like optical diffuser structure.

As mentioned above and although not shown in FIG. 2, an alternative optical device uses a holographic diffuser structure based on a surface relief structure, which can be coated and embedded in the optical device. The advantage of this method is that the surface of the diffuser structure does not contain large height discontinuities, and therefore does not suffer from the shadowing effect. The properties of the hologram can be designed to give varying scattering angles over the surface of the hologram, thereby directing scattered light in the desired directions.

Figure 3A:
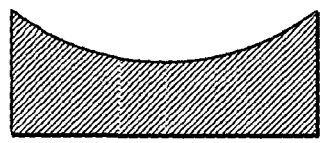
FIG. 3 shows the steps of fabricating an embodiment of a curved transparent diffuser of the present invention.
Figure 3B:
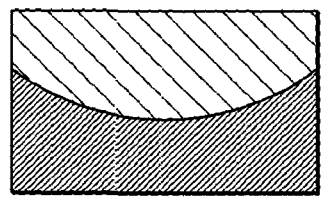
Figure 3C:
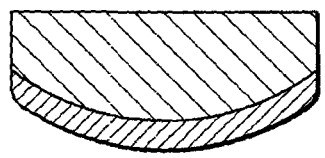
Figure 3D:

FIGS. 3a to d shows exemplary steps of fabrication of a curved transparent optical device. The first step is to vacuum-form a curved optical diffuser panel (FIG. 3a). Then, a silicone mould is created using the curved optical diffuser panel (FIG. 3b). Next, an optical diffuser structure is cast onto the curved silicone substrate and the optical diffuser structure is coated, for example, with a layer of evaporated aluminium (FIG. 3c). Finally, layers with matching refractive index are over-cast onto the top and bottom of the optical diffuser structure (FIG. 3d). Co-molding the lens after coating with the same material as the optical diffuser structure is made of would substantially assist in matching refractive indices.

Although not shown in the Figures, embedding an optical diffuser structure within an optical device can also be manufactured in a number of other ways, some of which are described below.

Firstly, part of the optical device could be injection moulded or cast with the optical diffuser structure surface exposed, then the optical diffuser structure surface could be coated and then the coated optical diffuser structure surface could be further injected, co-moulded, cast or slumped with the same or substantially similar refractive index material. For example, the media may comprise glass and the glass may be slumped onto another glass surface that has been etched and/or coated.

Secondly, the optical diffuser structure surface could be similarly cast or embossed onto a pre-existing optically clear surface and overcast/overmoulded with the same or substantially similar refractive index material.

Thirdly, using a conformal mould (such as silicone, for example, Sylgard 184), an optical diffuser structure surface could be replicated from an existing optical diffuser structure, and cast onto the required optical surface. This is particularly useful for non-flat optical surfaces, for example, smoothly varying optical surfaces such as curved mirror shapes. The original optical diffuser structure surface, which is usually initially flat, can be pre-distorted to a similar shape to the final desired product so that the mould is created in a similar shape to the required surface. This can be achieved by a number of processes including, but not limited to, vacuum forming, thermal distortion to a similarly shaped mould under gravity, successive replications of the flat original surface to the final curved surface via a series of intermediate conformal moulds that are cast from the previous replicated surface and then used to replicate the optical diffuser structure surface onto a more curved surface approaching the final desired surface.

Fourthly, an optically smooth surface can be produced, and then this surface can be post-processed to create an optical diffuser structure surface, for example, by bead blasting, etching, scouring or deposition of particles or droplets. This can also be a subtractive or additive process. This is particularly useful for forming an optical diffuser structure surface on top of surfaces such Fresnel-like structures where sharp edges of the corners make direct replication more difficult.

Fifthly, microlenses can be used as the optical diffuser structure surface.

Sixthly, holograms can be used as the optical diffuser structure surface, and can be used to vary the primary diffusion angle and the spread of angles over the holographic area.

Seventhly, grayscale lithography can be used to fabricate the optical diffuser structure surface.

Figure 4B:
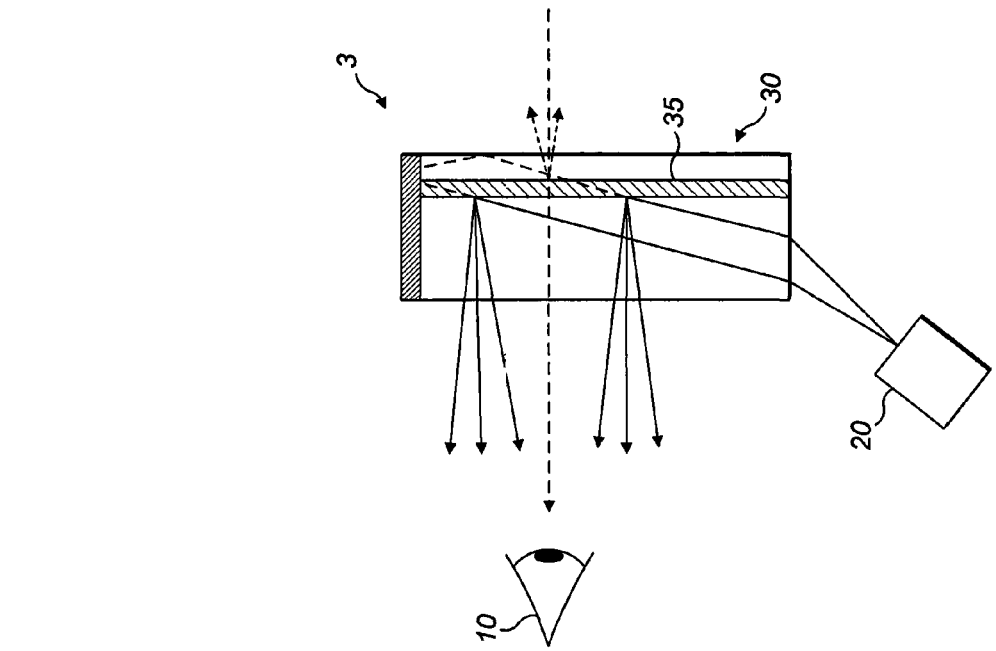
FIG. 4 shows another embodiment of the present invention.
Figure 4A:
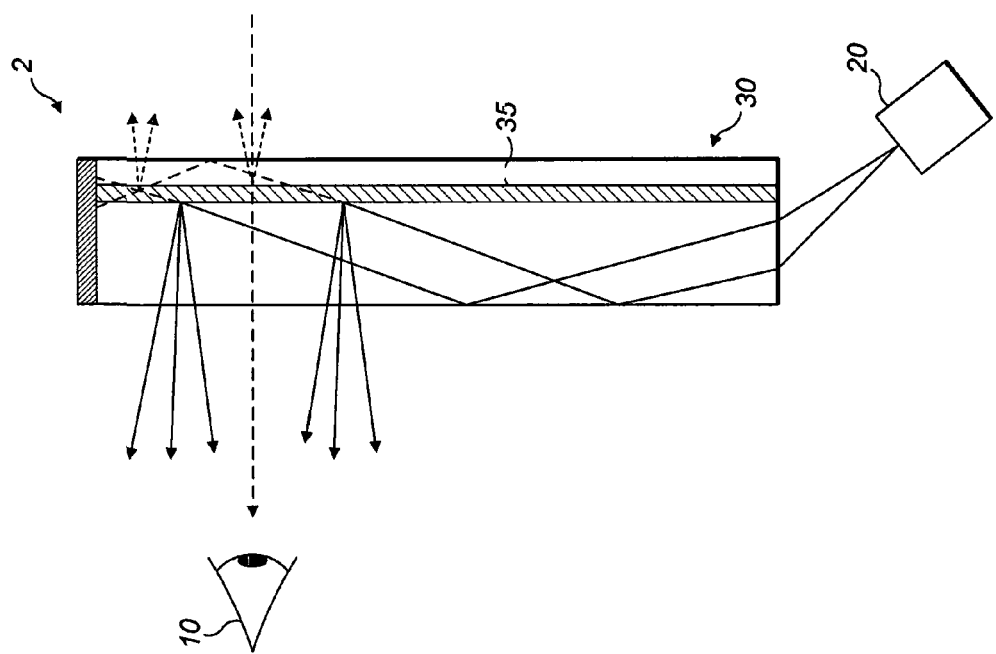

FIG. 4 shows two examples of systems 2, 3 of the present invention whereby light from the projector 20 is injected into the optical device 30 through the edges rather than projected from substantially the same direction as the direction of the observer 10 relative to the optical device 30. In this example, the external projector 20 is substantially out of sight, and the observer 10 is unlikely to block any light from the projector 20, as is potentially the case in the system of FIG. 1. The light from the projector 20 is guided towards the optical diffuser structure 35 either directly (as shown in FIG. 4b), or via total internal reflectance (as shown in FIG. 4a), where it is then reflected and diffused towards the observer 10. Any light that is transmitted through the optical diffuser structure 35 can be directed towards a beam dump (not shown in FIG. 4), either directly or via another total internal reflectance surface (at most one more total internal reflectance surfaces in order to avoid multiple ghost images). In examples of the present invention where the light that is injected from the edges of the optical device 30 typically falls onto the optical diffuser structure 35 at a shallow glancing angle, then the projector 20 is preferably a laser projector such that that the spot size is conveniently small and that a high resolution of the display is achieved.

It should also be noted that the systems of the present invention that comprise projectors that inject light through the edges of the optical devices are not restricted to using optical devices with flat sides; the shape of the optical device may be curved or any other suitable shape to allow for larger projector light entrance or to ensure that ghost images are avoided.

Figure 5A:
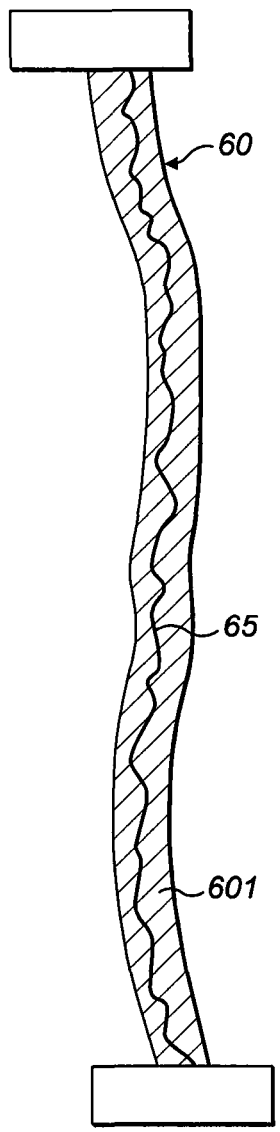
FIG. 5 shows two further embodiments of the present invention.
Figure 5B:
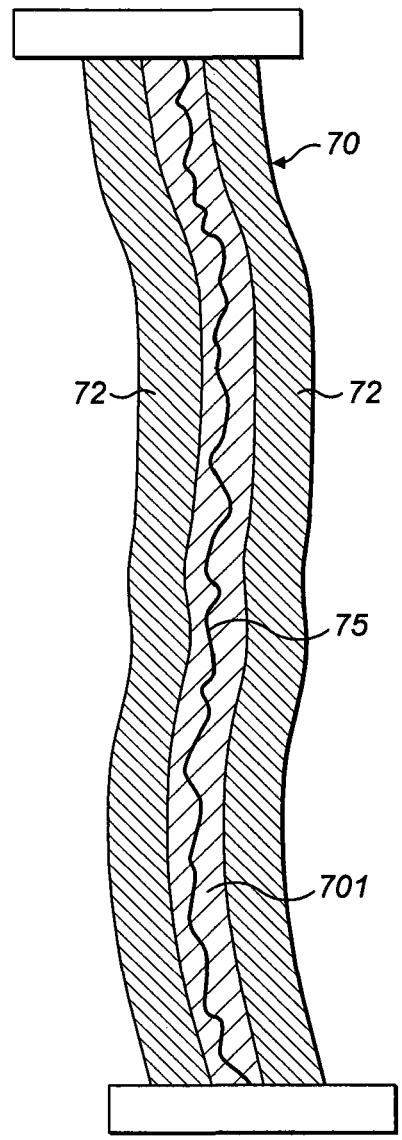

FIG. 5 shows alternative examples of the present invention whereby the optical devices 60, 70 are flexible displays and the displays can be stored in a rolled, folded, screwed up or similar compact state and then unfolded to form a larger display surface. The materials and thickness of the materials used determine the flexibility of the final optical devices 60, 70. The optical device 60 could be made of a single material with the diffuser surface incorporated within this material, as shown in FIG. 5a, or the optical device 70 could be part of a layered structure which may give additional robustness and choice of materials, as shown in FIG. 5b. The optical device 60 of FIG. 5a is relatively thin because only a thin inner layer 601 is used to support the optical diffuser structure 65. However, the optical device 60 of FIG. 5 is thicker because an outer layer 702 is used for additional support as well as the inner layer 701. Once opened out, the final surface of the optical device 60, 70 could be flat, curved, angled or any other shape depending on the specific purpose. For instance, the display could be rolled up into a roller hidden in a ceiling and then drawn down for viewing.

Alternatively, the display could be arranged to form a curved display that surrounds the user. The display does not necessarily need to be completely flat to show a reasonable quality image, particularly when a laser projector is used, which has an image with a very large depth of focus.

Figure 6A:
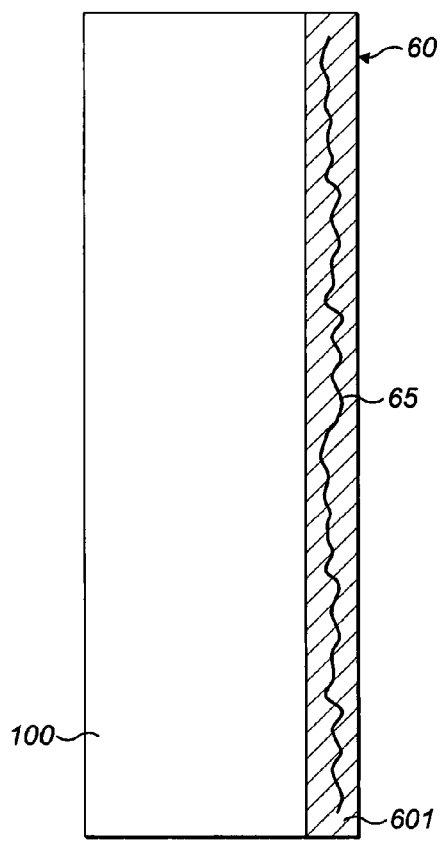
FIG. 6 shows two further embodiments of the present invention.
Figure 6B:
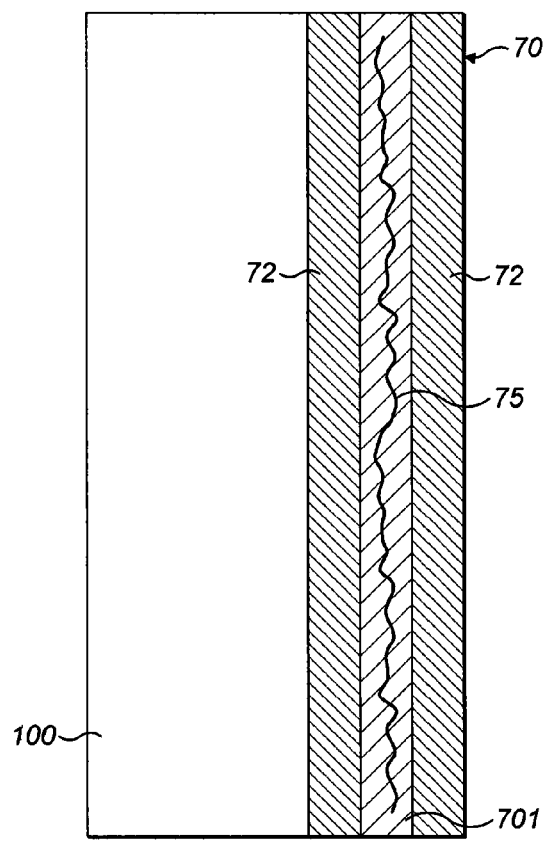

FIG. 6 shows examples of the optical devices 60, 70 of the present invention when applied as a laminate, for example to a window or the like. The optical device 60 of FIG. 6a only comprises inner layer 601 whereas the optical device 70 of FIG. 6b comprises inner layer 701 and outer layers 702 that may provide extra robustness and better adhesion.

Figure 7A:
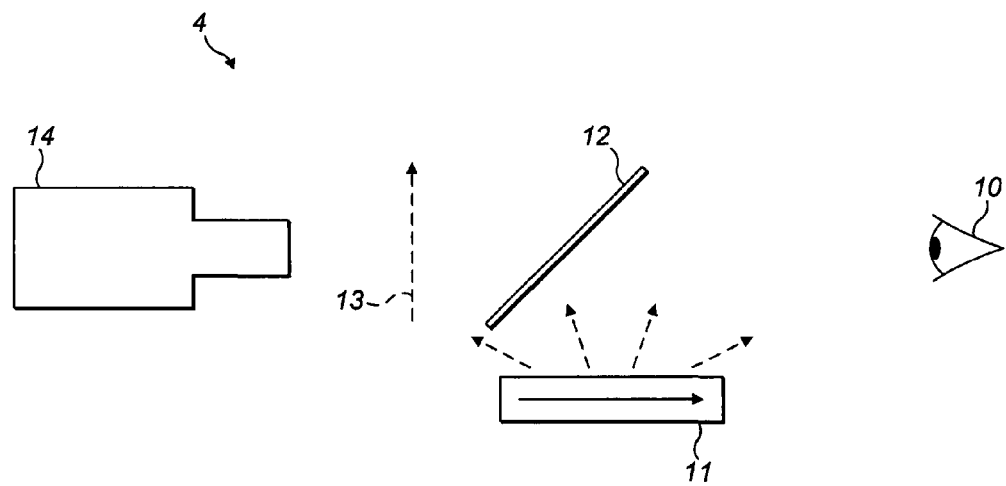
FIG. 7 shows a comparison between a prior art display system and an embodiment of the present invention.

FIG. 7a shows a prior art projection system 4 for an autocue system which comprises a display 11, a screen 12 and the position of the image 13 as viewed by an observer 10. In autocue technology, the screen 12 is transparent to the camera 14 but it also comprises a partially silvered mirror which allows the observer 10 to see the autocue script in front of the camera 14 at the position of the image 13. The screen 12, which is substantially equiangular between display 11 and the position of the image 13, reflects light from the horizontally-placed display 11 (typically a high brightness LCD screen) which displays the autocues. However, this system presents several disadvantages. One disadvantage of this prior art approach is that display 11 is a diffuse light source and therefore a large proportion of light emitted from display 11 does not reach the observer, thus being wasted. Another disadvantage is that the partially silvered mirror on the screen 12 only typically reflects 30-40% of the light from the display 11 and therefore the display 11 needs to be brighter than normal in order for the image as observed by the observer 10 to be bright enough. Consequently, the display 11 requires additional fans to cool the system, which adds substantial mass and inertia to the camera system. Furthermore, the 60-70% transmission of the screen 12 means that the studio lighting that is required is higher than that required for use with a 100% transmission mirror, thus increasing the energy costs for lighting.

Figure 7B:
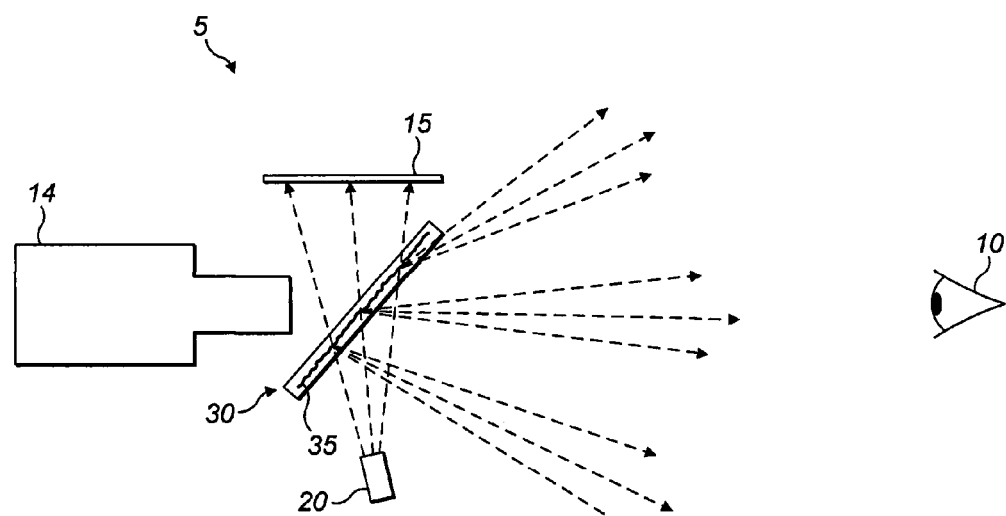

FIG. 7b shows an embodiment of the present invention for use in an autocue system 5 where screen 12 is replaced by optical device 30 at substantially the same position and orientation. Light from projector 20 with large depth of focus is projected onto optical device 30 with optical diffuser structure 35 embedded therein. Some of this light is reflected by the optical diffuser structure 35 towards the observer and the remainder of the light is transmitted through the optical device 30 and absorbed by hood 15. At the same time, camera 14 sees and incoming image that is unaffected by optical device 30 or optical diffuser structure 35. A significant advantage of this arrangement over the prior art is that a large, inefficient LCD screen is replaced with a small projector 20, thus significantly reducing the mass and inertia of the system.

Since the light from the picoprojector has a well-defined light cone, the optical device 30 must ensure that the reflected light reaches the observer 10. The approach adopted by the embodiment of the present invention shown in FIG. 7b uses a highly diffusive flat optical diffuser structure 35 that scatters light in all directions, including light that dos not reach the observer as well as light that does reach the observer. This is particularly advantageous for situations where a wide range of viewing angles is required. However, this may be inefficient should only a small range of viewing angles be required.

Figure 8:
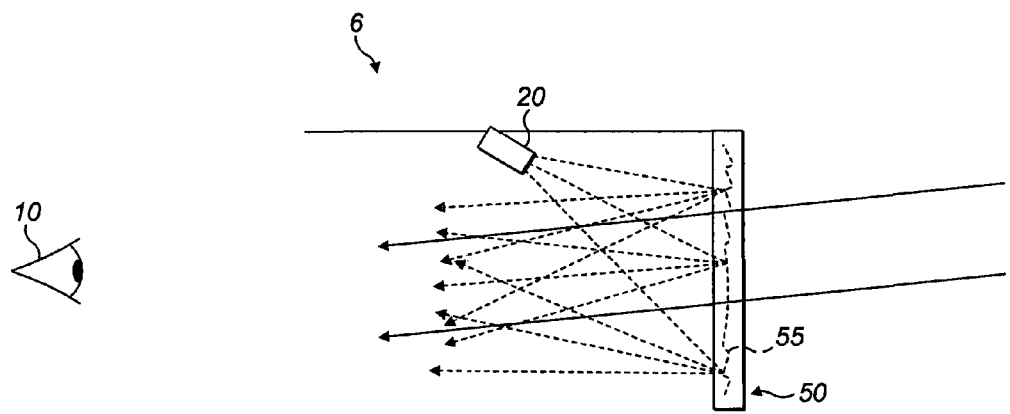
FIG. 8 shows another embodiment of the present invention.

FIG. 8 shows an embodiment of the present invention for use in an entertainment and information display system, for example, for car windscreens for navigational guidance or passenger windows for entertainment systems. The transmitted light from the outside world is unaffected in its transmission through optical device 50 (for example, a car window) other than a small reduction in intensity corresponding to the reflectivity and absorption of the coating on the optical diffusing structure 55. The light originating from projector 20 is partially reflected from the Fresnel optical diffusing structure 55 optical device 50 towards observer 10 together with light from the outside world such that total light, i.e. a superposition of the projected image and the background, reaches the observer 10.

Figure 9:
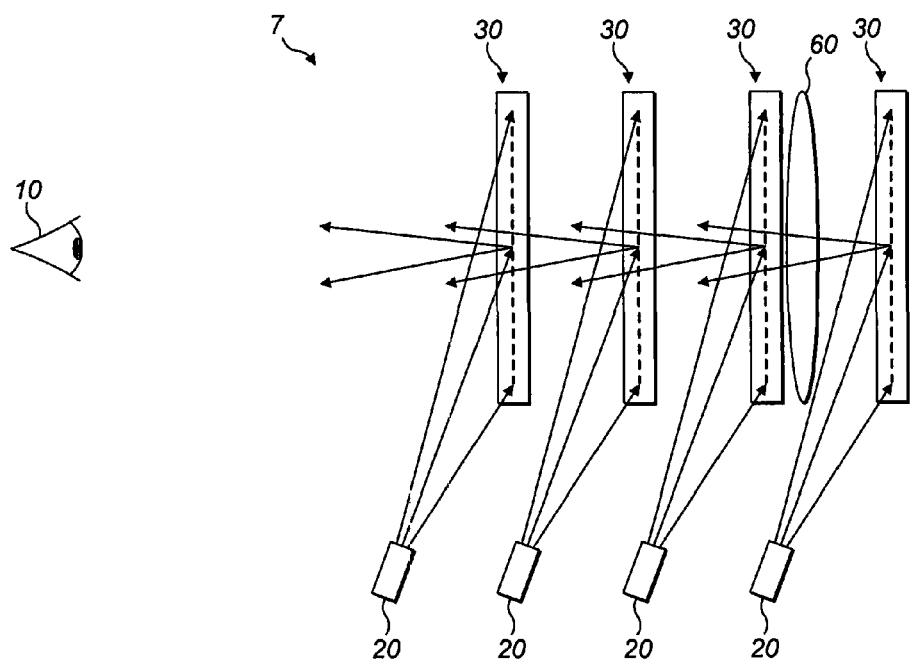
FIG. 9 shows another embodiment of the present invention.

FIG. 9 shows an embodiment of the present invention used to produce 3D volumetric displays, in which several cascaded optical devices 30 and projectors 20 are used to produce a series of scattering surfaces for the image to be projected onto. The reflected light from the scattering surfaces is transmitted straight through the other optical devices to the observer 10, thereby forming a good quality 3D image to the observer 10. For reasons of compactness, optional lens 60 may be positioned on one side of the cascaded scattering surfaces to change the apparent focal distance of the image to the observer 10.

The invention claimed is:

1. An optical device formed as a substantially flexible laminate, the optical device comprising an optical diffuser structure embedded between media, the media having substantially the same optical refractive index as each other, the structure comprising a partially reflective optical coating at the interface between the media, wherein the partially reflective optical coating comprises a relief profile such that, in use, the optical diffuser structure diffuses light in reflection from the partially reflective optical coating and delivers substantially no optical deflection in transmission.

2. An optical device according to claim 1, wherein the relief profile has a depth of between 0.1 micron and 500 microns.

3. An optical device according to claim 1, wherein the relief profile has a depth of over 500 microns.

4. An optical device according to claim 1, wherein the optical diffuser structure follows a surface of a flat plane.

5. An optical device according to claim 1, wherein the optical diffuser structure follows a curved surface.

6. An optical device according to claim 1, wherein the optical diffuser structure follows a segmented curved structure.

7. An optical device according to claim 1, wherein the partially reflective optical coating reflects a band of wavelengths of light.

8. An optical device according to claim 1, wherein the partially reflective optical coating reflects visible or near-visible light.

9. An optical device according to claim 1, wherein the partially reflective optical coating has controllable variable reflectivity.

10. An optical device according to claim 9, wherein the reflectivity of the partially reflective optical coating is dependent upon at least one of time, temperature, position with respect to incident light, polarisation of incident light or the wavelength of incident light.

11. An optical device according to claim 1, wherein the device further comprises a partially transmitting mirror.

12. An optical device according to claim 11, wherein the partially transmitting mirror is embedded between the media of substantially the same optical refractive index and adjacent the optical diffuser structure.

13. An optical device according to claim 11, wherein the partially transmitting mirror is outside and adjacent the media of substantially the same optical refractive index.

14. A system comprising:
an optical device according to claim 1; and
a projector arranged in use to project light onto the optical diffuser structure.

15. A system according to claim 14, wherein the projector is arranged to project light through the front of the optical device.

16. A system according to claim 14, wherein the projector is arranged to inject light through the side of the optical device.

17. A system according to claim 14, wherein the optical device is arranged for use in at least one of an autocue system, architectural applications, general display applications, augmented reality applications or head up displays, ophthalmetry, automotive lighting applications, solar cells or three dimensional displays.

18. An optical device according to claim 1, wherein the optical diffuser structure follows a surface of a Fresnel-like structure.

19. A method of displaying images, the method including the steps of:

applying an optical device as a substantially flexible laminate, the optical device comprising an optical diffuser structure embedded between media, the media having substantially the same optical refractive index as each other, the structure comprising a partially reflective optical coating at the interface between the media, wherein the partially reflective optical coating comprises a relief profile such that, in use, the optical diffuser structure diffuses light in reflection from the partially reflective optical coating and delivers substantially no optical deflection in transmission; and providing a projector and projecting images onto the diffuser structure so that they can be viewed by an observer viewing the optical device.

* * * * *